(12) United States Patent
Hart et al.

(10) Patent No.: US 7,594,519 B2
(45) Date of Patent: *Sep. 29, 2009

(54) FLOW REGULATOR

(75) Inventors: Keith Hart, Worcestershire (GB); Uwe Zoller, Mullheim (DE); Christoph Weis, Mullheim (DE)

(73) Assignee: Neoperl GmbH, Mullheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/908,331

(22) PCT Filed: Feb. 1, 2006

(86) PCT No.: PCT/EP2006/000854

§ 371 (c)(1),
(2), (4) Date: Sep. 11, 2007

(87) PCT Pub. No.: WO2006/094581

PCT Pub. Date: Sep. 14, 2006

(65) Prior Publication Data

US 2008/0277011 A1    Nov. 13, 2008

(30) Foreign Application Priority Data

Mar. 14, 2005    (DE)    .................... 20 2005 004 195 U (51) Int. Cl.
*G05D 7/01* (2006.01)
(52) U.S. Cl. .......................................... 138/43; 138/46
(58) Field of Classification Search .................... 138/43, 138/45, 46, 94; 239/420, 428.5
See application file for complete search history.

(56) References Cited

U.S. PATENT DOCUMENTS 2,954,936 A * 10/1960 Shames et. al. .......... 239/428.5

(Continued)

FOREIGN PATENT DOCUMENTS

DE    19851151    5/2000

(Continued)

*Primary Examiner*—James F Hook
(74) *Attorney, Agent, or Firm*—Volpe and Koenig, P.C.

(57) ABSTRACT

A flow regulator (50) having a controller housing (1) which has a central body (3) in a passage channel (2) is provided, with the central body (3) being bounded by an annular throttle body (4) made from an elastic material that delimits a control gap (6) between itself and an adjacent peripheral lateral surface (5) which is provided with control recesses (7, 7') that are spaced apart from one another in the circumferential direction and are oriented in the flow direction (Pf1, Pf2), with the passage cross-section of the control gap (6) being variable via the throttle body (4) deforming under the pressure difference created as the flow passes through. The present flow regulator (50) has an open flow cross-section of the control gap (6) that can be varied by a change in the relative position of the throttle body (4) and the peripheral lateral surface (5), in that the relative position of the throttle body (4) and the peripheral lateral surface (5) can be set as a function of the flow direction (Pf1, Pf2) of the fluid flowing through the passage channel (2), and the central body (3) is embodied as a conical pin, control cone or similar control body which has the control recesses (7, 7') and has at least two sub-sections having different cone-shaped, pin-shaped or similar control body cross-sections and/or control recesses (7, 7') for changing between at least two flow capacities and/or at least two pressure ranges.

10 Claims, 5 Drawing Sheets

U.S. PATENT DOCUMENTS

| | | | | |
|---|---|---|---|---|
| 2,960,109 | A * | 11/1960 | Wilson | 137/517 |
| 3,216,451 | A * | 11/1965 | Cosby | 137/861 |
| 3,386,461 | A * | 6/1968 | Fisher | 137/237 |
| 3,749,122 | A * | 7/1973 | Gold | 137/515.7 |
| 3,847,178 | A * | 11/1974 | Keppel | 137/515.7 |
| 3,970,105 | A * | 7/1976 | Pelton et al. | 137/498 |
| 4,562,960 | A * | 1/1986 | Marty et al. | 239/72 |
| 4,867,198 | A | 9/1989 | Faust | |
| 5,743,291 | A * | 4/1998 | Nehm et al. | 137/454.2 |
| 6,571,831 | B1 * | 6/2003 | Hart | 138/46 |
| 7,308,902 | B2 * | 12/2007 | Williams et al. | 137/15.18 |
| 7,325,572 | B2 * | 2/2008 | Schinazi et al. | 138/43 |
| 7,527,075 | B2 * | 5/2009 | Zoller | 138/43 |
| 2004/0079418 | A1 | 4/2004 | Weis et al. | |
| 2008/0277010 | A1 * | 11/2008 | Zoller | 138/43 |

FOREIGN PATENT DOCUMENTS

| | | |
|---|---|---|
| DE | 10228490 | 11/2003 |
| EP | 1600839 | 11/2005 |

* cited by examiner

FLOW REGULATOR

BACKGROUND

The invention relates to a flow regulator with a regulator housing, which has, in a passage channel, a central body, which is surrounded by an annular throttle body made from elastic material, wherein this throttle body bounds a control gap between itself and an adjacent peripheral surface provided with control recesses, which are spaced apart from each other in the circumferential direction and which are oriented in the flow direction, wherein the passage cross-section of the control gap can be changed by the throttle body deforming under the pressure difference created by the flow.

Flow regulators of the type noted above are already known in different constructions. With the help of such flow regulators, the maximum flow rate per unit of time to a sanitary consuming location can be made uniform independent of the water pressure of the flowing water. In many fields of use, however, it would be desirable to be able to change the maximum flow rate, in order to be able to adapt the flow rate of the water to be heated to the different flow temperatures in summer and winter for gas wall heaters. Such a change or adjustment of the flow rate has usually been possible until now only by exchanging the flow regulator and replacing it with a different flow regulator with a different flow rate. The expense associated with exchanging such a flow regulator, however, can be relatively high.

SUMMARY

Therefore, there is the objective, in particular, of creating a flow regulator of the type noted above, which allows the changing of the maximum flow rate and/or the provided pressure range and which nevertheless is relatively simple in its production and construction.

The solution according to the invention for meeting this objective is provided in that, in particular, for the flow regulator of the type noted above, the open passage cross-section of the control gap can be changed by changing the relative position of the throttle body and peripheral surface, the relative position of the throttle body and peripheral surface can be set as a function of the flow direction of the fluid flowing through the passage channel, and the central body is constructed as a control peg, control cone, or a similar control body, which has control recesses and which features at least two sub-sections with different cone, peg, or similar control body cross-sections and/or control recesses for changing between at least two flow rates and/or at least two pressure ranges.

In the flow regulator according to the invention, the central body surrounded by the annular throttle body is constructed as a control peg, control cone, or a similar control body, which carries the control recesses oriented in the flow direction. This central control body has at least two sub-sections, to which are allocated at least two flow rates and/or at least two pressure ranges and which differ from each other through different cone, peg, or similar control body cross-sections and/or control recesses. By changing the relative position of the throttle body and the peripheral surface, the throttle body is allocated selectively to either one or the other sub-section of the control peg, control cone, or a similar control body, which corresponds to the necessary desired value of the flow rate or the desired pressure range. Here, the relative position of the throttle body and the peripheral surface can be pre-selected and set as a function of the flow direction of the fluid flowing through the passage channel. By simply reversing the direction of flow of the fluid in the flow regulator, this can be changed from one set of control characteristics into a different set of control characteristics.

The flow regulator according to the invention can be used advantageously, for example, in gas wall heaters, in which a flow rate of the water to be heated is to be adapted to the flow temperatures of the water, which are different in summer and winter.

To change the relative position of the throttle body and the peripheral surface provided on the control peg, control cone, or a similar control body, it is useful when the throttle body and/or the central body can move in the regulator housing.

The throttle body can be allocated particularly well to the sub-sections of the control peg, control cone, or a similar control body provided for certain flow rates or pressure ranges when the throttle body and/or the central body can move between two throttle body or central body stops as a function of the flow direction. In this embodiment, the throttle body and/or the central body is pressed according to the flow direction of the fluid flowing through the flow regulator either against one or the other throttle body or central body stop, which corresponds to a certain flow rate through its allocation of throttle body and control peg, control cone or control body sub-section.

An especially advantageous and functionally secure embodiment according to the invention provides that in the housing interior of the regulator housing there is a guide peg, on which the central body is guided by means of a guide opening in a shiftable manner.

It is especially advantageous if the central body is constructed as a preferably uniformly tapering control cone. In this embodiment, the throttle body can interact with the control cone in nearly any relative position, wherein a plurality of different flow rates are also possible if the throttle body is held in the housing interior so that it can move and can be fixed.

If the control peg, control cone, or a similar control body can move in the housing interior, it is advantageous when the throttle body is held on the housing inner periphery of the regulator housing in a groove or a similar throttle body holder so that it essentially cannot be displaced in the flow direction.

To change the flow direction in the housing interior of the flow regulator according to the invention and to be able to bring the throttle body or the control peg, control cone, or a similar control body into the relative position allocated to a certain flow rate, an improvement according to the invention is provided, in that the flow regulator is provided in a reversing part connected in the fluid line and the reversing part is supported so that it can rotate in the fluid line for changing the flow direction in the flow regulator for an otherwise constant flow direction in the adjacent line sections of the fluid line.

BRIEF DESCRIPTION OF THE DRAWINGS

Additional features of the invention result from the following description of embodiments according to the invention in connection with the claims and also the drawing. The individual features can be implemented separately or in combination for an embodiment according to the invention.

Shown are.

DETAILED DESCRIPTION OF THE PREFERRED EMBODIMENTS

FIGS. 1 to 44 show five different constructions 10, 20, 30, 40, and 50 of a flow regulator, which can be connected in a fluid line, especially in a sanitary water line, in order to adapt the water flow rate per unit time to a certain maximum value, independent of the water pressure. The flow regulator 10, 20, 30, 40, 50 have a regulator housing 1, which has a central body 3 in a passage channel 2. The central body 3 is surrounded by an annular throttle body 4 made from elastic material, which bounds a control gap 6 between itself and an adjacent peripheral surface 5.

The passage cross-section of the control gap 6 can change through a throttle body 4 deforming under the pressure difference created by the fluid flow. Here, control recesses 7, 7', which are spaced apart from each other in the circumferential direction and which are oriented in the flow direction and into which the throttle body 4 can expand for increased pressure of the fluid, are provided on the peripheral surface 5.

In the flow regulator 10, 20, 30, 40, 50, the open passage cross-section of the control gap 6 can change between at least two flow rates and/or at least two pressure ranges in different ways by changing the relative position of the throttle body 4 and peripheral surface 5. Here, the relative position between the throttle body 4 and the peripheral surface 5 can be preselected and set as a function of the flow direction Pf1, Pf2 of the fluid flowing through the passage channel 2.

The central body 3 of the flow regulator 10, 20, 30, 40, 50 shown here is constructed as a control peg, control cone, or a similar control body, which has the control recesses 7, 7' and which features two or more sub-sections with different cone, peg, or control body cross-sections and/or control recesses 7, 7'.

To change the relative position between the throttle body 4 and the peripheral surface 5 provided on the control peg, control cone, or a similar control body—the control cone, control peg, or similar control body 3 of the flow regulator 10, 40, and 50, can be moved in the regulator housing 1. In contrast, the flow regulator 20 and 30 have a control body 3, which is held so that it cannot be displaced in the flow direction and which is surrounded by a throttle body 4 that can move in the regulator housing 1.

Here, the moving throttle bodies or control bodies 3, 4 can move in the flow regulator 10, 20, 30, 40, 50 between two central body stops 8 or throttle body stops 9 as a function of the flow direction Pf1, Pf2.

The control body 3 of the flow regulator 10, 40, and 50 has a guide opening 11, by which the control body 3 is guided in a shiftable manner along a guide peg 12 located in the housing interior of the regulator housing 1. In these flow regulators 10, 40, and 50, the throttle body 4 is held on the housing inner periphery of the regulator housing 1 in a groove 13 or a similar throttle body holder so that it essentially cannot be displaced in the flow direction.

While the flow regulators 10 and 20, which differ in the shape and size of their control recesses, have a control body 3 with two sub-sections that differ in their flow rate or in the provided pressure range, the control body of the flow regulator 30, 40, and 50 has a conical construction, so that the throttle body 4 here can interact with the control cone 3 in nearly any relative position, in order to allow at least two different flow rates or pressure ranges.

FIGS. 9 and 10 or 19 and 20 show the output curves of the flow regulator 10, 20 each in the two functional positions. As can be taken from a comparison of the figures, the flow regulators 10, 20 can each be used selectively according to the engagement position of the throttle body 4 relative to the corresponding peripheral surface 5 for a lower pressure application or for a high pressure application at a constant nominal flow rate. In the flow regulator 10, while the control body 3 can be brought with its peripheral surface 5 into a different preferred position and thus into a different functional position, reversing the flow direction Pf1, Pf2 in the flow regulator 20 causes a change in the functional position of the throttle body 3.

The flow regulators 10, 20, 30, 40, 50 shown here can be used advantageously, for example, in gas wall heaters, in which the flow rate of the water to be heated is adapted to the flow temperatures of the water, which differ in summer and winter.

To change the flow direction in the housing interior of the flow regulator 50 and to be able to bring the control cone 3 into the relative position allocated to a certain flow rate relative to the throttle body 4, the flow regulator shown in FIGS. 37 to 44 is held in a reversing part 14, which is connected in the fluid line. This reversing part 14 is supported in the fluid line so that it can rotate for changing the flow direction in the flow regulator 50 for an otherwise constant flow direction in the adjacent line sections of the fluid line. This reversing part 14 is supported so that it can rotate in a ball valve-type line adapter 15, which can be inserted into a fluid line.

The line adapter 15, which can also be used as a ball valve and whose reversing part 14 can also be used simultaneously as a valve ball, can be activated from the outside by a lever.

Figures 1, 3:
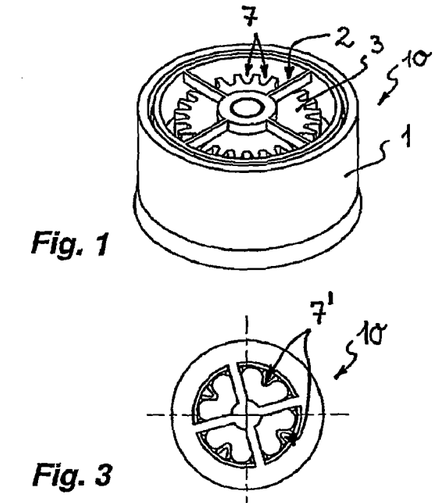
FIGS. 1 to 10 a flow regulator, whose control peg or similar control body is guided in a shiftable manner in the housing interior of the regulator housing for changing the provided control range or pressure range, such that one of the two sub-sections of the control body, which do not differ in their flow rate but do differ in their pressure range, interacts with the throttle body surrounding it, wherein the flow regulator is shown in a perspective view (FIGS. 1 and 2), in a top view of one housing end (FIGS. 3 and 4), in a longitudinal section (FIGS. 5 and 6), in a top view of the other housing end (FIGS. 7 and 8), and in the output curves of its two functional positions having different pressure ranges according to FIGS. 1, 3, 5, and 7 on one hand and FIGS. 2, 4, 6, and 8 on the other hand, FIGS. 11 to 20 a flow regulator in views comparable with FIGS. 1 to 8, wherein here the throttle body can move between two functional positions as a function of the flow direction in the flow regulator, which selectively allow a low pressure or high pressure application of this flow regulator for a nominally equal flow rate per unit of time, FIGS. 21 to 28 a flow regulator with a throttle body that can move between two throttle body stops in views comparable with FIGS. 1 to 8 or 11 to 18, wherein the central control body is constructed here as a control cone, and wherein the flow regulator shown here is distinguished in its different functional positions through different flow rates per unit of time, FIGS. 29 to 36 a flow regulator, whose control body constructed as a control cone can move between two control cone stops relative to a throttle body which is held so that it cannot be displaced in the flow direction, and FIGS. 37 to 44 a flow regulator with a control cone, which can move between two functional positions and which is held so that it can rotate in a reversing part of a line adapter connected in the fluid line, wherein the flow regulator is shown in a longitudinal section (FIGS. 38 and 42), also through the line adapter (FIGS. 37 and 41), in a perspective view of the line adapter (FIGS. 39 and 43), and also the output curves corresponding to its different functional positions (FIGS. 40 and 44).
Figures 2, 4:
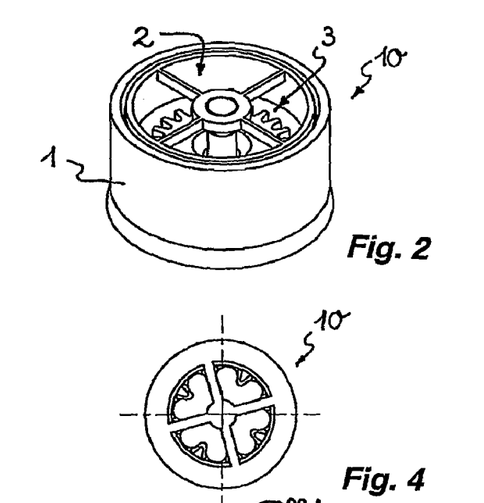
Figure 5:
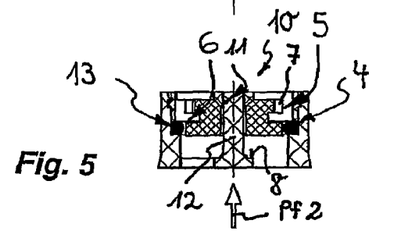
Figure 6:
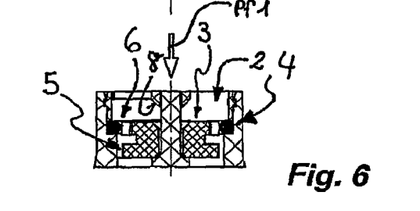
Figure 7:
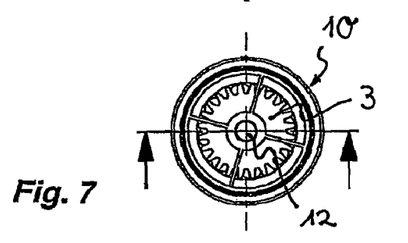
Figure 8:
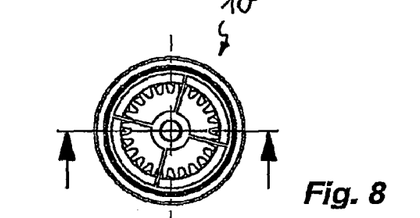
Figure 9:
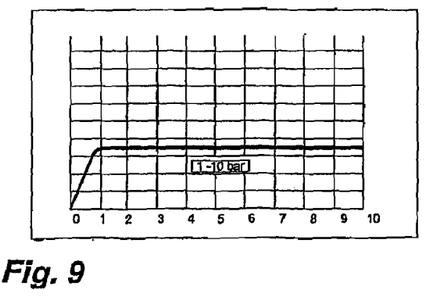
Figure 10:
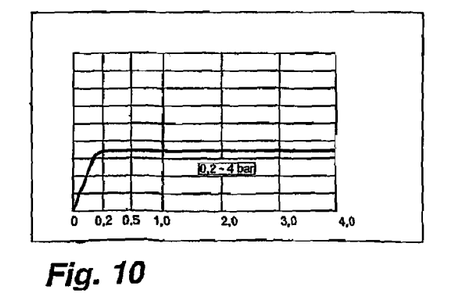
Figure 11:
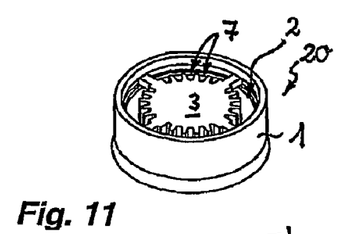
Figure 12:
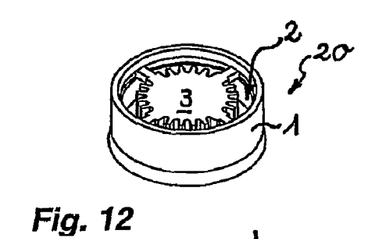
Figure 13:
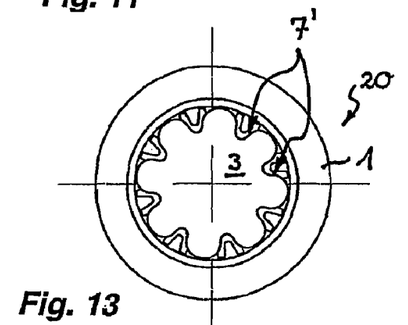
Figure 14:
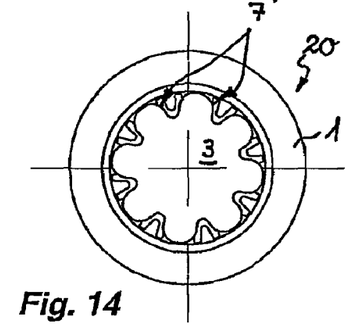
Figure 15:
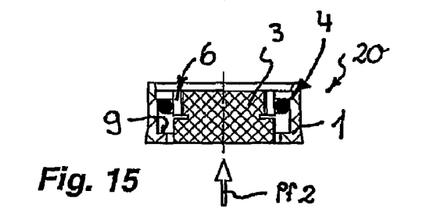
Figure 16:
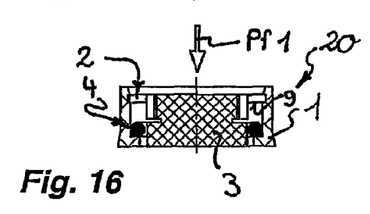
Figure 17:
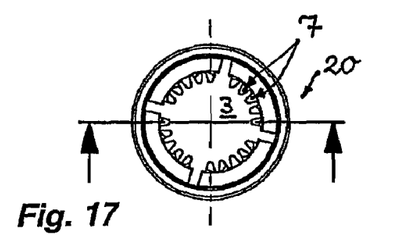
Figure 18:
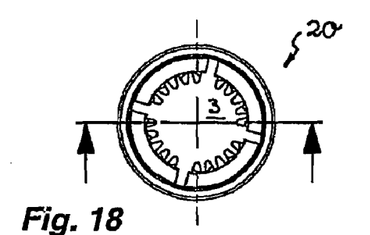
Figure 19:
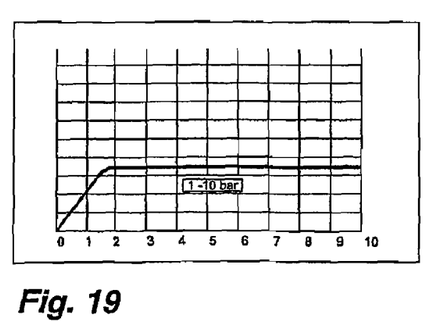
Figure 20:
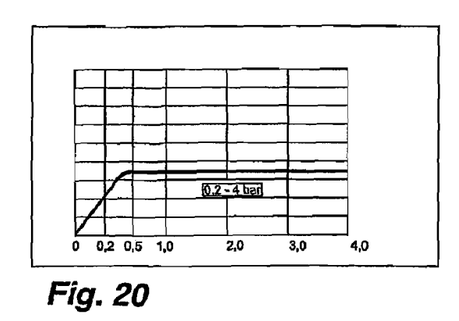
Figure 21:
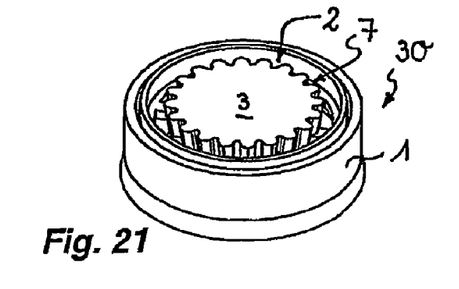
Figure 22:
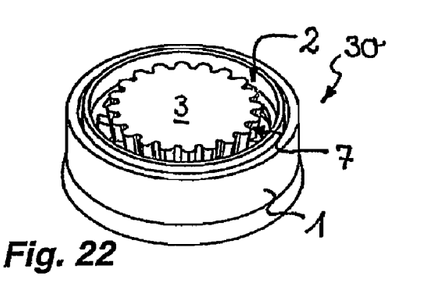
Figure 23:
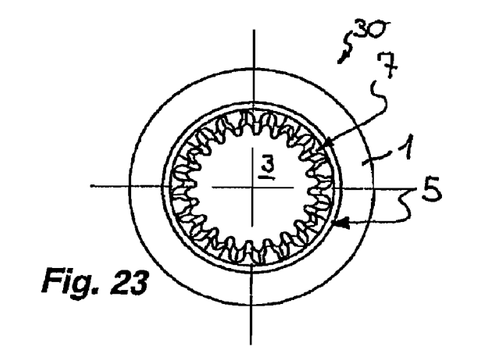
Figure 24:
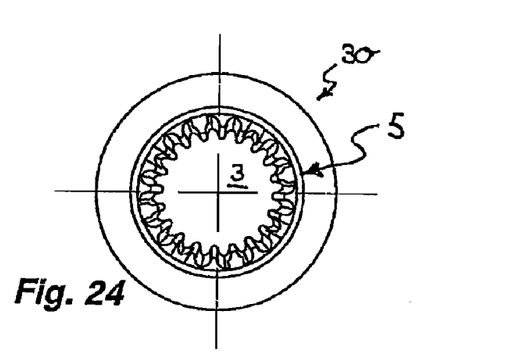
Figure 25:
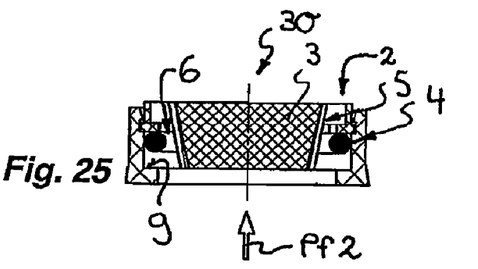
Figure 26:
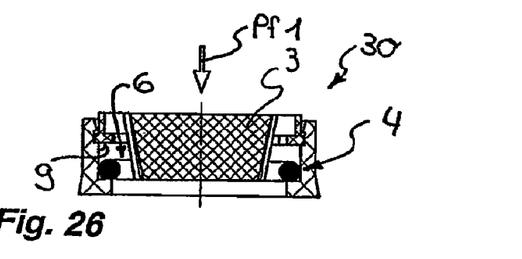
Figure 27:
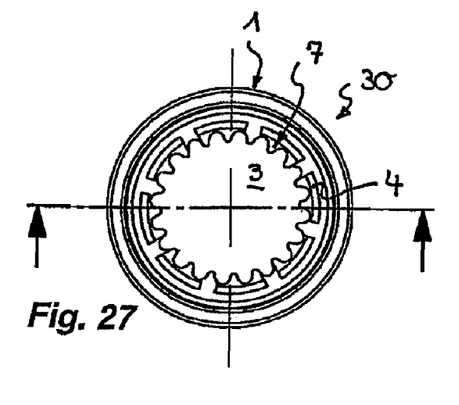
Figure 28:
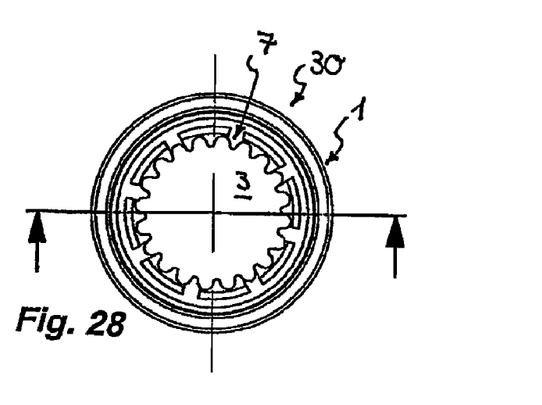
Figure 29:
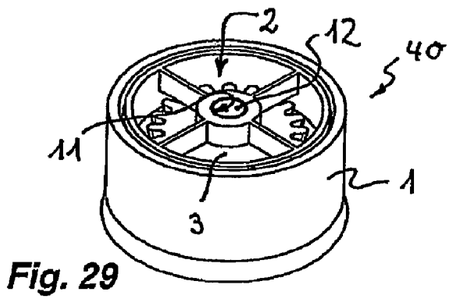
Figure 30:
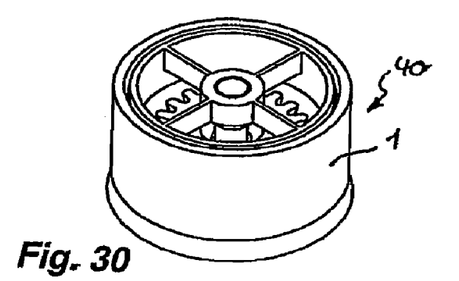
Figure 31:
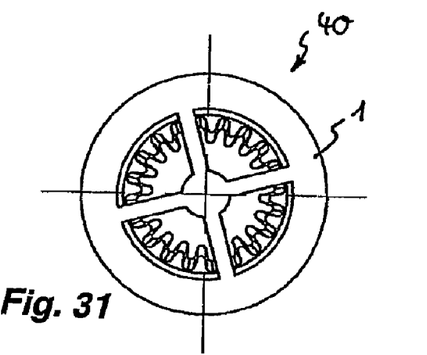
Figure 32:
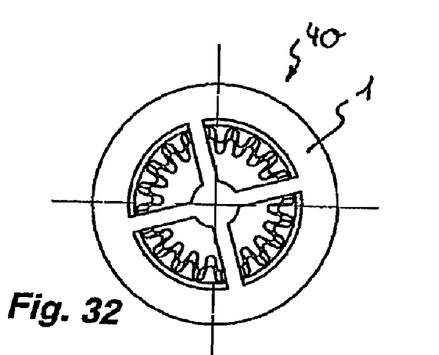
Figure 33:
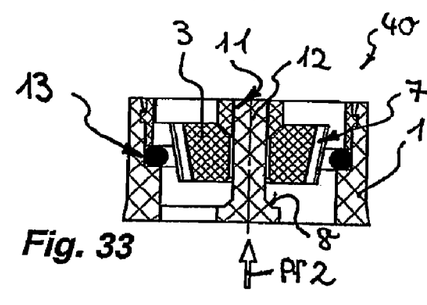
Figure 34:
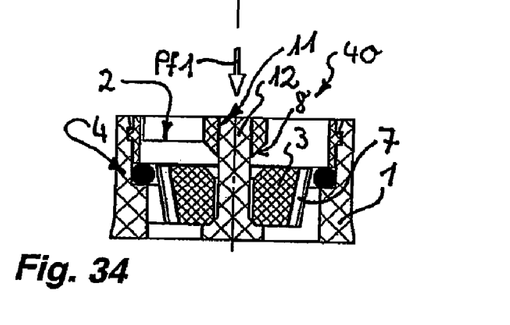
Figure 35:
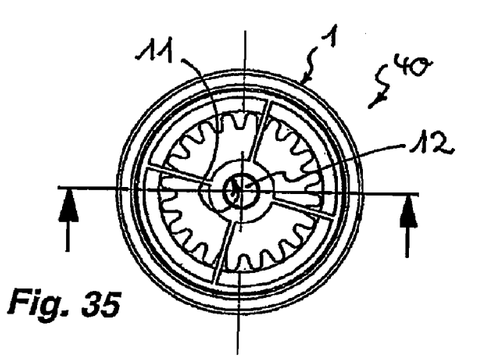
Figure 36:
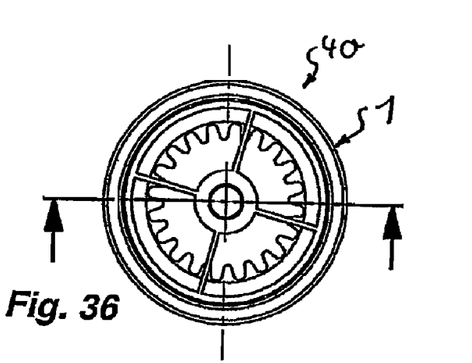
Figures 37, 38, 39:
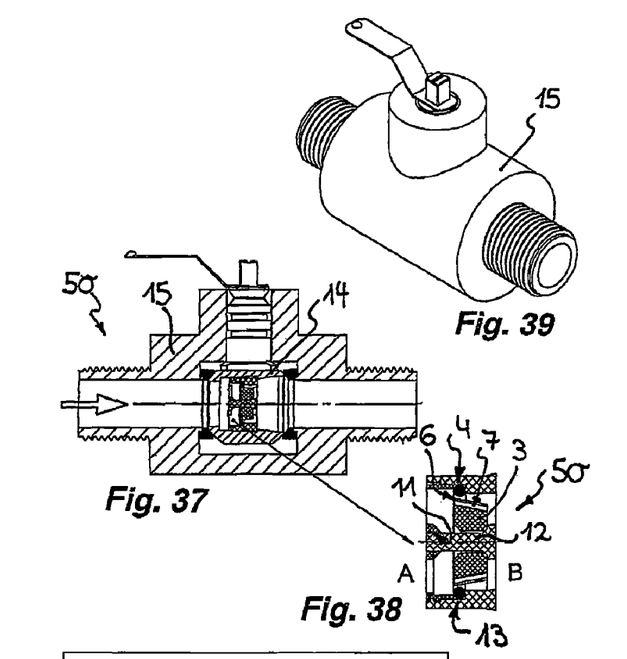
Figure 40:
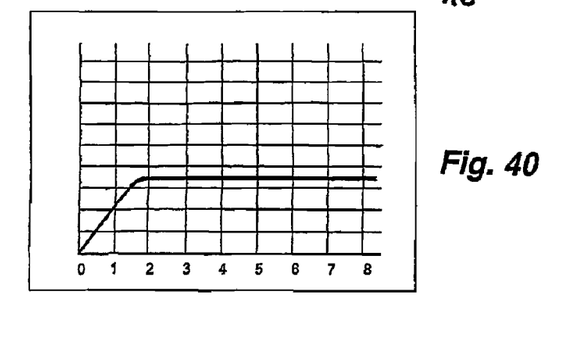
Figures 41, 42, 43:
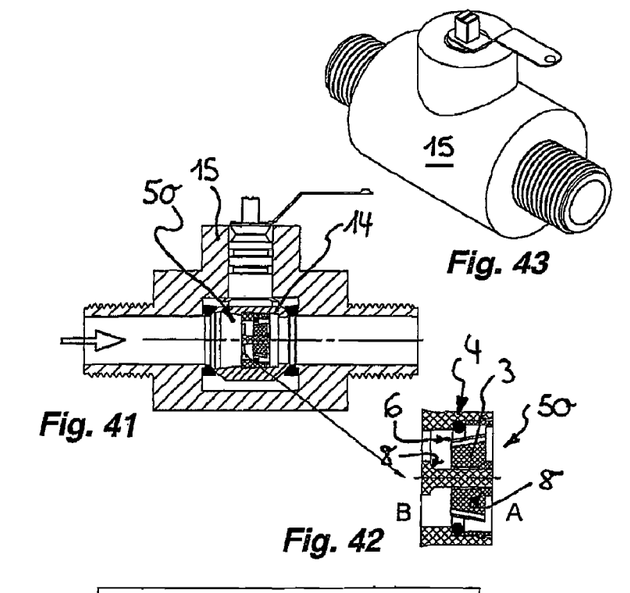
Figure 44:
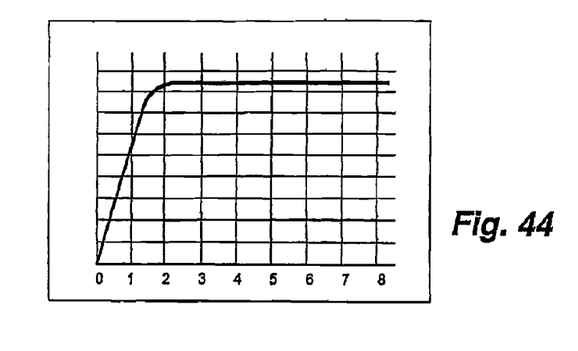

In FIGS. 40 and 44, the flow curves are shown, which are set when the flow regulator 50 is operated in the functional position shown in FIGS. 37 to 39 on one hand and the functional position shown in FIGS. 41 to 43 (cf. FIG. 44).

It is understood that a flushing flow, which entrains possible dirt particles deposited on the end of the flow regulator and which removes these particles from the area of the flow regulator, is also simultaneously generated by changing the flow direction in the flow regulators shown here.

The invention claimed is:

1. Flow regulator (10, 40, 50) comprising a regulator housing (1) with a central body (3), having a grooved profiled core, in a passage channel (2), the central body is surrounded by an annular throttle body (4) made from elastic material, the throttle body (4) bounds a control gap (6) between itself and an adjacent peripheral surface (5) provided with control recesses (7) spaced apart from each other in a circumferential direction and oriented in a flow direction (Pf1, Pm2), a passage cross-section of the control gap can be changed by the throttle body (4) deforming under a pressure difference created by the flow, an open passage cross-section of the control gap (6) can be changed by changing a relative position of the throttle body (4) and the peripheral surface, the relative position of the throttle body (4) and peripheral surface (5) can be set as a function of the flow direction (Pf1, Pf2) of the fluid flowing through the passage channel (2), and the central body (3) is constructed as a control peg, control cone, or a control body, which includes the control recesses (7) and which includes at least two sub-sections with different cone, peg, or control body cross-sections for changing between at least one of two flow rates or at least two pressure ranges.

2. Flow regulator according to claim 1, wherein the central body (3) can move axially in the regulator housing (1).

3. Flow regulator according to claim 2, wherein the central body (3) can move between two central body stops (8) as a function of the flow direction.

4. Flow regulator according to claim 1, wherein a guide peg (12), on which the central body (3) is guided in a shiftable manner via a guide opening (11), is provided in a housing interior of the regulator housing (1).

5. Flow regulator according to claim 1, wherein the central body (3) is constructed as a uniformly tapering control cone.

6. Flow regulator according to claim 1, wherein the throttle body (4) is held on the housing inner periphery of the regulator housing (1) in a groove (13) or a throttle body holder so that it essentially cannot be displaced in the flow direction.

7. Flow regulator according to claim 1, further comprising a reversing part (14) in which the flow regulator is located connected in the fluid line and the reversing part (14) is supported so that it can rotate in the fluid line for changing the flow direction through the flow regulator (50) for an otherwise constant flow direction in adjacent line sections of the fluid line.

8. Flow regulator (20, 30,) comprising a regulator housing (1) with a central body (3), having a grooved profiled core, in a passage channel (2), the central body is surrounded by an annular throttle body (4) made from elastic material, the throttle body (4) bounds a control gap (6) between itself and an adjacent peripheral surface (5) provided with control recesses (7') spaced apart from each other in a circumferential direction and oriented in a flow direction (Pf1, Pf2), a passage cross-section of the control gap can be changed by the throttle body (4) deforming under a pressure difference created by the flow, an open passage cross-section of the control gap (6) can be changed by changing a relative position of the throttle body (4) and the peripheral surface, the relative position of the throttle body (4) and peripheral surface (5) can be set as a function of the flow direction (Pf1, Pf2) of the fluid flowing through the passage channel (2) and the central body (3) is constructed as a control peg, control cone, or a control body, which includes the control recesses (7') and which includes at least two sub-sections with different control recesses (7') for changing between at least one of two flow rates or at least two pressure ranges.

9. Flow regulator according to claim 8, wherein the throttle body (4) can move axially in the regulator housing (1).

10. Flow regulator according to claim 9, wherein the throttle body (4) can move between two throttle body stops (9) as a function of the flow direction.

* * * * *

UNITED STATES PATENT AND TRADEMARK OFFICE
CERTIFICATE OF CORRECTION

| | | |
|---|---|---|
| PATENT NO. | : 7,594,519 B2 | Page 1 of 1 |
| APPLICATION NO. | : 11/908331 | |
| DATED | : September 29, 2009 | |
| INVENTOR(S) | : Keith Hart et al. | |

It is certified that error appears in the above-identified patent and that said Letters Patent is hereby corrected as shown below:

IN THE CLAIMS

In Claim 1, at column 5, line 12, replace "Pm2" with -- Pf2 --.

Signed and Sealed this

Fifth Day of January, 2010

David J. Kappos
*Director of the United States Patent and Trademark Office*